Oct. 4, 1938.  A. G. F. WALLGREN  2,131,773
BEARING
Original Filed Oct. 25, 1932  3 Sheets-Sheet 1

INVENTOR
August Gunnar Ferdinand Wallgren
BY
Wm. T. Hedlund
his ATTORNEY

Oct. 4, 1938.  A. G. F. WALLGREN  2,131,773
BEARING
Original Filed Oct. 25, 1932  3 Sheets-Sheet 2

INVENTOR
August Gunnar Ferdinand Wallgren
BY
Wm. T. Hedlund
his ATTORNEY

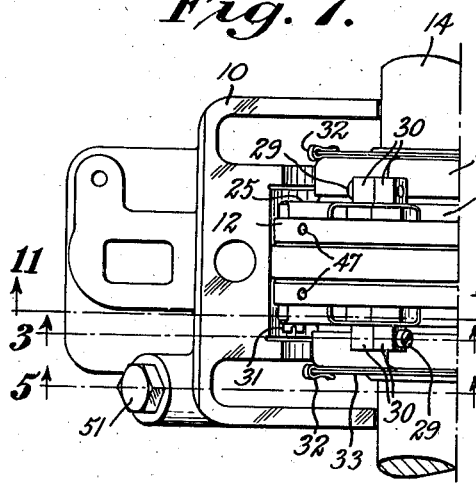
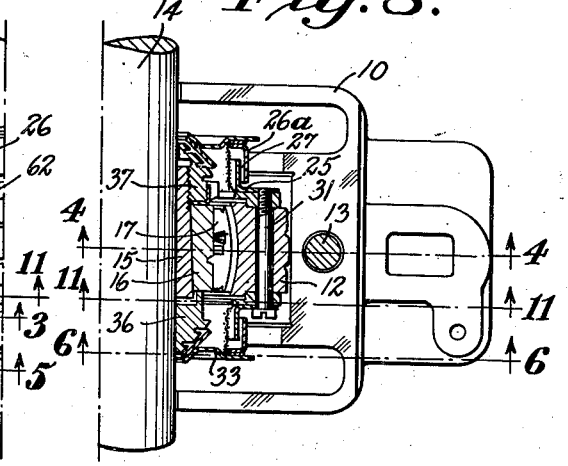
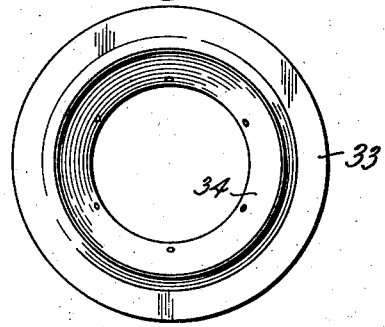
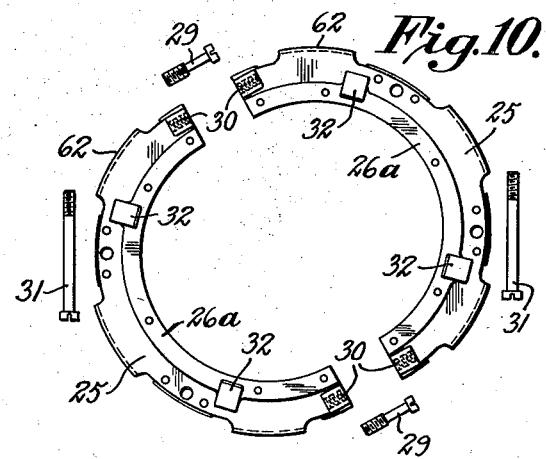
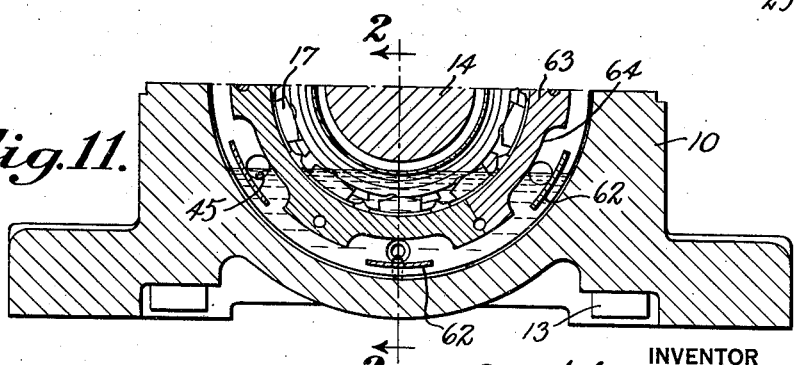

Patented Oct. 4, 1938

2,131,773

UNITED STATES PATENT OFFICE

2,131,773

BEARING

August Gunnar Ferdinand Wallgren, Stockholm, Sweden, assignor to Aktiebolaget Nomy, Lidkoping, Sweden, a corporation of Sweden Application October 25, 1932, Serial No. 639,402. Renewed August 17, 1936. In Sweden October 31, 1931

27 Claims. (Cl. 308—73)

My invention relates to bearings, and more particularly to the lubrication of bearings. Although I have developed the present invention for bearings of the general type shown in my U. S. Patent No. 1,871,485, granted August 16, 1932, the invention is not limited to bearings of this specific type.

The principal object of the invention is to provide apparatus for adequately lubricating bearings, and more specifically to provide circulating means for lubrication in bearings, especially of the tilting block type, such that sufficient lubricant is always supplied to the relatively moving surfaces, which lubricant is of proper quality for operation. Another object of the invention is to prevent oil leakage from a bearing housing for bearings of the above and analogous kinds.

In the preferred form of my invention I provide hoods laterally of the sliding surfaces of the bearing, which hoods are mounted on a stationary part of the bearing, and which, together with the rotating parts, form chambers on both sides of the bearing through which circulation of oil is maintained due to centrifugal action. This is preferably caused by providing parts of different radial extent from the axis of rotation whereby a differential of centrifugal force is produced. Due to this action the oil is forced to flow continuously from one of the chambers through the bearing and into the chamber on the other side.

Also in accordance with the invention, leakage of oil from the chambers is prevented due to the utilization of centrifugal force.

Further objects and the nature and advantages of the invention will appear from the following description taken in conjunction with the accompanying drawings forming a part of this specification, and of which:

Fig. 7 is a top plan view of the bearing;

Fig. 8 is a horizontal sectional view taken on the line 8—8 of various other figures;

Fig. 9 shows an annular hood member forming part of the structure of the previous figures;

Fig. 10 shows a split hood member forming part of the structure of the previous figures; and Fig. 11 is a sectional view taken on the line 11—11 of various other figures.

Figure 1:
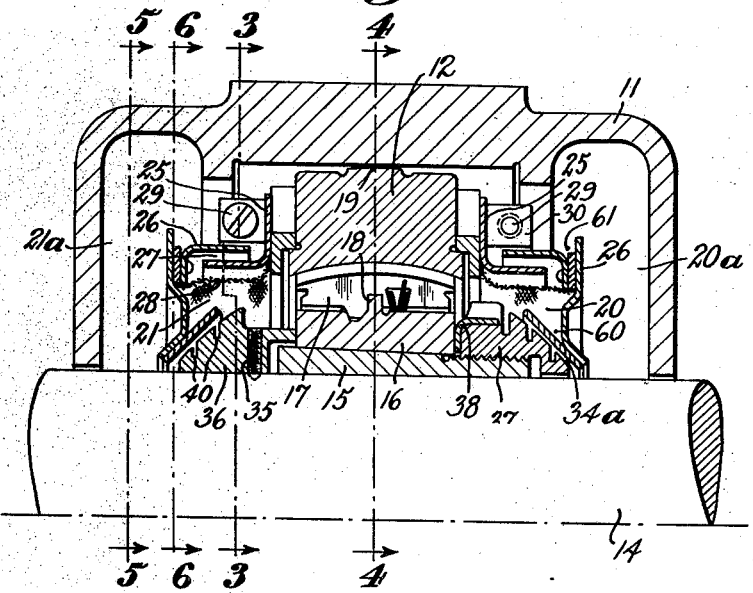
Fig. 1 is an axial sectional view of a shaft and bearing embodying the invention, taken on the line 1—1 of various other figures.

The structure as a whole includes a shaft, a bearing unit, and a housing. The bearing housing comprises a lower part 10 and an upper part 11. These parts mate on the horizontal center plane and are held together by bolts 13. The bearing unit includes an outer bearing member or race ring 12. Secured to the shaft 14 by means of a clamping sleeve 15 is an inner ring member or carrier ring or driving member 16 on which a number of bearing blocks 17 are tiltably supported. The parts 12, 16 and 17 are the essential parts of the bearing unit, which may be made in accordance with my aforesaid patent as modified by the disclosures in the following copending applications:

Janson, U. S. Serial No. 479,621, filed September 4, 1930, Patent No. 1,915,275 granted June 27, 1933; Wallgren, U. S. Serial No. 544,767, filed June 16, 1931, Patent No. 1,900,875 granted March 7, 1933; Wallgren, U. S. Serial No. 591,467, filed February 8, 1932, Patent No. 1,920,726 granted August 1, 1933; Wallgren, U. S. Serial No. 612,447, filed May 20, 1932, Patent No. 1,995,408 granted March 26, 1935.

Figure 4:
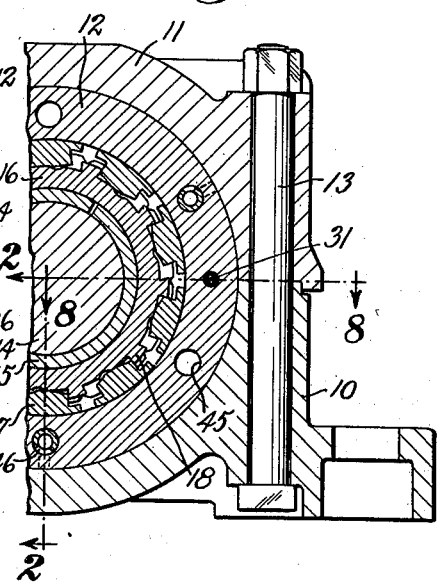
Fig. 4 is a transverse sectional view taken on the line 4—4 of various other figures.

The bearing blocks 17 have outer curved sliding surfaces which preferably are spherical, or substantially spherical, and have relative sliding movement with respect to the inside surface of race ring 12, which inside surface is also preferably spherical, or substantially spherical. The center of the spheres of these sliding surfaces is preferably on, or substantially on, the axis of rotation. The bearing blocks are carried in rotation with the inner ring 16 by means of projections 18 (Fig. 4) on the inner ring, which projections, depending upon the direction of rotation, abut against one or the other end of each block. The spherical formation of the surfaces permits the shaft to be out of alignment with the axis of the outer ring 12. The outer surface of the outer ring 12 is also preferably spherical, or substantially spherical, as shown at 19 in Fig. 1. This permits the bearing to adjust itself on axial displacement of the shaft, the outer ring assuming an inclined position, as is fully explained in Patent No. 1,995,408.

The space on each side of the bearing unit within the bearing housing is divided into a plurality of chambers by means of hood members.

The hood members include an inner hood member 25, which is secured to the outer ring 12, and an outer hood member 26 secured to member 25 by rivets or the like 25a. Hood members 25 and 26 are so constructed and arranged that an annular space 27 is formed between them and extends in an axial direction. The hood members 25 and 26 provide inner chambers 20 and 21 and outer chambers 20a and 21a. The space 27 between the hood members on either side is in open communication with the outer chamber on the respective sides. Lubricant flowing through spaces 27 is caused to pass through a screen 28, which may be secured to either member 25 or member 26, or both.

Figure 3:
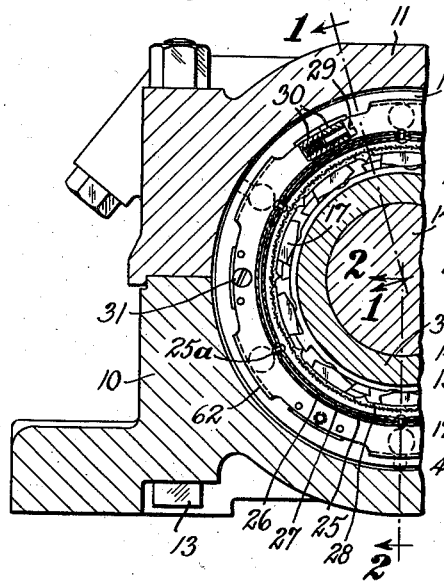
Fig. 3 is a transverse sectional view taken on the line 3—3 of various other figures.

The hood members 25 and 26 are preferably made as shown in Figs. 9 and 10. The more central part 33 of member 26 is made, as shown in Fig. 9, with an oblique flange 34. The outer part 26a and the hood member 25 are made in two halves, as shown in Fig. 10, which parts are secured together by means of screws 29 fitting into apertured lugs 30 on member 25. The inner hood member 25 is provided with suitable screw holes for securing it to the outer member 12 of the bearing unit by means of screws 31, as shown in Figs. 3 and 8. The outer parts 26a of the hood member 26 are provided with flanges 32, which are folded over and retain the undivided hood part 33.

Figure 2:
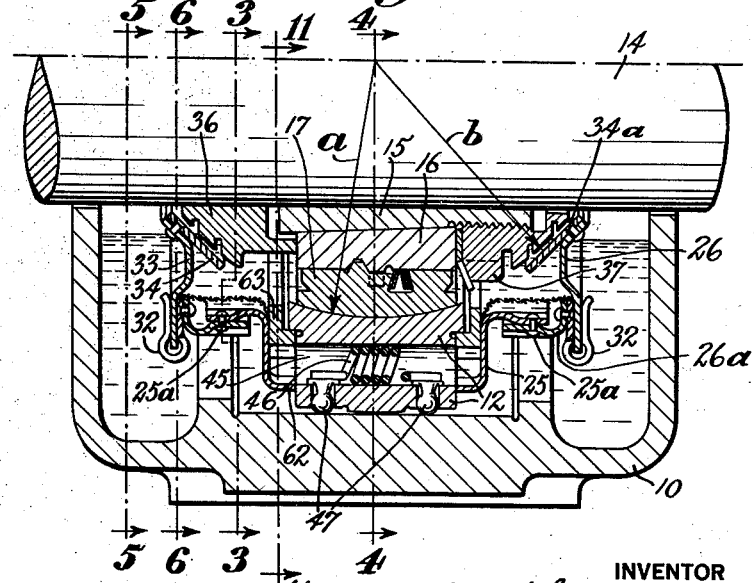
Fig. 2 is an axial sectional view taken on the line 2—2 of various other figures.

The hood members cooperate with a member 36 secured to the shaft by a set screw 35 on the side of chamber 21 and with a somewhat similar member 37 on the side of chamber 20. Member 37 is threaded to the clamping sleeve 15 and locked by means of a lock disc 38. The members 36 and 37 are adjacent but spaced from the flange plates 34 of the hood members 26 to form narrow passages 34a adjacent the shaft connecting the inner chambers with the outer chambers. These passages extend in such direction that they counteract oil leakage from the chambers 20 and 21. These channels are further preferably so disposed that they extend along the surface of a sphere or tangent to a sphere, having the same axis as the sliding surfaces of the blocks and member 12, respectively. This is shown at a and b in Fig. 2. The two members 36 and 37 are also provided with recesses or grooves 40 extending preferably around the same. These parts are so made that the part 37 extends radially further outward from the axis of rotation than the outermost edge of the part 36.

In ring member 12, axial channels 45 are provided of which there are six symmetrically distributed around the periphery in the embodiment shown. In one or more of said channels, helical springs 46 are provided having projections 47, which latter extend through radial holes in member 12. The purpose of these springs is to return member 12 to center position after a cessation of axial thrust causing an oblique position of the same.

The hood member 25 is provided with axial flanges 62 (Fig. 2, Fig. 11) of which there are six distributed around the periphery in such a manner that each flange extends on the sides of the channels 45, as will be more clear from the following. Between hood member 25 and race 12 an annular disc 63 is interposed having recesses 64 around channels 45.

The oil level in the bearing housing is positioned below shaft 14. Oil is filled through the oil filling opening 50 (Fig. 5) which is normally closed by a screw plug 51.

When the bearing rotates, oil is caused to move in chambers 20 and 21 due to the movement of blocks 17 and members 36 and 37. However, inasmuch as there are no moving parts in chambers 20a and 21a, except shaft 14, which is above the oil level, the oil in these chambers will not be disturbed and it will not be thrown up onto the shaft. Within chambers 20 and 21, on the other hand, the rotation of members 37 and 36, respectively, throws oil toward the periphery of the chambers and the oil thus thrown out against the internal surface of the hood member 25 is prevented from passing out from the inner chambers 20 and 21 above the oil level as the annular spaces 27 between hood members 25 and 26 extend in axial direction thus leaving no straight way for the oil to escape. Due to the fact that member 37 has a greater diameter than member 36, the centrifugal action on the oil will be greater in chamber 20 than in chamber 21 and oil runs therefore between the blocks 17, thereby lubricating them, to chamber 20. Consequently, the oil level in said chamber is raised above the level in the outer chamber 20a and oil is in this way pressed out from chamber 20 to chamber 20a at the lower part of channel 27 on this side. Oil is supplied to chamber 21 from chamber 21a through that portion of passage 27 which is below the oil level. Oil forced out from chamber 20 into chamber 20a may pass therefrom through channels 45 to chamber 21a. It will be noted that all of the oil which lubricates the bearing surfaces must pass through filter screen 28 and therefore the bearing surfaces are supplied with clean oil.

While one or more of the channels 45 in the outer race 12 are below or just at the same level as the oil level, the channels above the oil level serve the purpose of equalizing undesired differences in air pressure between the chambers 21a and 20a. Such differences may occur for instance if one side of the bearing is located near some part of a machine which induces a draft of air through the bearing. If, on the contrary, there were no free passage for the air from chamber 20a to 21a, the difference in air pressure in these chambers would force the air to flow through the spaces 27 on one side of the bearing, through the latter and further through channel 27 on the other side into the outer chamber. In such case air passing through the hoods and bearing would easily carry oil vapor or foam existing in the inner chambers out to chambers 21a and 20a, respectively, or further out from the bearing housing thus causing oil leakage.

The oil level in the bearing housing may under certain conditions, for instance at very high speed of revolution, be covered by oil foam. If now, for instance, one of the channels 45 should happen to be located only partly above the oil level as shown in Fig. 11, the air might on passing the channel seize the foam and carry it out of the bearing housing. In order to prevent any oil leakage in this way, the channels are at a distance covered by the flanges 62 on the hoods 25, which flanges are pressed tight to the outer race 12 at their circumference. The air jet is thus forced to pass above the oil level as it cannot escape without passing the upper edge of the flanges.

As above stated, the narrow spaces 34a between members 36 and 37 and the flanges 34 of the members 33 counteract leakage of oil from the chambers 20 and 21 as oil entering the spaces is thrown back by centrifugal action.

In case of obliquity of the journalled shaft, etc., the bearing can take inclined position relatively to its spherical sliding surfaces, and the rotating bearing parts consequently turn about the centre of said sliding surfaces. The surfaces of the members 36 and 37 forming the spaces 34a thus also rotate about the same centre and as this centre coincides with the centre of the stationary surfaces of spaces 34a formed by flange plates 34 the width of the spaces will be constant in spite of such obliquity. Due to the fact that the hood members 25 and 26 are secured to the stationary race 12 forming part of the bearing itself and which race can be axially displaced relatively to the bearing housing, the spaces 34a remain in their form also in case of axial displacement of the shaft, as the race 12 and the hoods 25 and 26 associated therewith follow the inner rotating bearing parts at such displacement. In the embodiment shown the race 12 rolls, in case of axial displacement of the shaft, on inner cylindrical surfaces of the bearing housing about an axis forming the centre for the spaces 34a and the bearing sliding surfaces, and takes an inclined position, in such manner, however, that the width of the spaces 34a always is constant.

The recesses 40 prevent leakage through the spaces 34a especially at slow rotation of the bearing or when it is stationary as oil which in such case happens to enter the upper part of the spaces 34a, follows the recesses 40 to the lower part of same from which the oil flows back into the chambers 20 and 21. From the above it will be evident that any leakage from the chambers 20 and 21 to the outer bearing housing or along the shaft will not take place through the packing spaces 34a. Furthermore, leakage of oil through the openings for the shaft in the bearing housing is effectively avoided.

Between the outer member 33 and the flange 34 is a recess 60 (Fig. 1), which prevents oil following the member 33 from directly reaching the shaft 14. A similar construction is provided in hood member 26, as is shown at 61.

Figure 5:
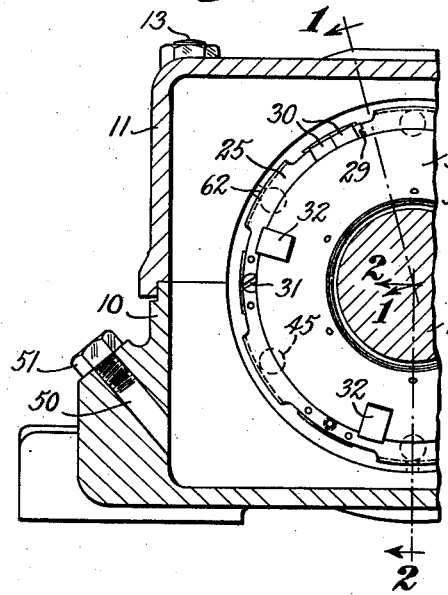
Fig. 5 is a transverse sectional view taken on the line 5—5 of various other figures.
Figure 6:
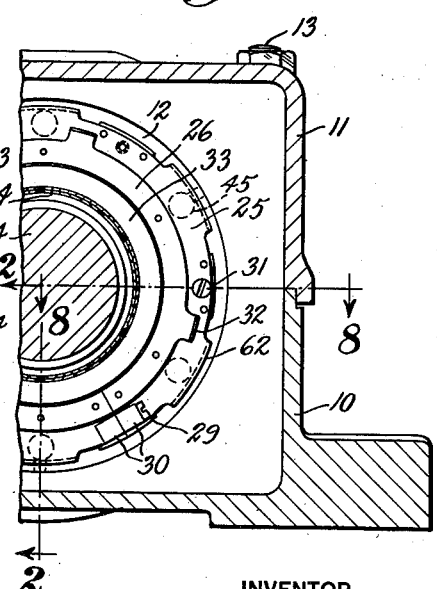
Fig. 6 is a transverse sectional view taken on the line 6—6 of various other figures.

The bearing housing is preferably made invertible so that the housing may be suspended from a ceiling or the like. An oil filling opening similar to that shown in Fig. 5 is also arranged in the other half of the housing (see Fig. 3) and is intended to be used when the bearing housing is suspended in inverted position. The oil filling opening when not in operation may serve as an air vent hole for the bearing housing.

While I have described a preferred form of my invention, it will be clear that variations may be made within the spirit and scope thereof.

What I claim is:

1. A bearing comprising a housing forming a lubricant reservoir, a stationary outer member, an inner rotary member, a plurality of bearing blocks having operative positions radially between said members, hoods forming chambers laterally of said bearing blocks, and rotary members associated with said chambers and dipping into the lubricant in said reservoir and adapted to produce centrifugal forces in said chambers of different magnitude.

2. A bearing comprising a housing forming a lubricant reservoir, a stationary outer member, an inner rotary member, a plurality of bearing blocks having operative positions radially between said members, hoods forming chambers laterally of said bearing blocks, and rotary members extending into said chambers and dipping different distances into the lubricant in said reservoir and adapted to create different values of centrifugal force in said chambers for producing flow of lubricant past said blocks.

3. A bearing comprising a housing, a bearing unit in said housing including a stationary member, a rotary member and load-transmitting elements therebetween, hoods on each side of said unit in said housing providing inner and outer chambers on each side and a communication between each chamber on each side, and means for producing a higher oil level in one of said inner chambers than in the adjacent outer chamber, and a higher oil level in one inner chamber than the other inner chamber.

4. A bearing comprising a housing, a bearing unit in said housing including a stationary member, a rotary member and load-transmitting elements therebetween, hoods on each side of said unit in said housing providing inner and outer chambers on each side and a communication between each chamber on each side, means for producing a higher oil level in one of said inner chambers than the adjacent outer chamber and a higher oil level in one inner chamber than the other inner chamber, and means for screening fluid flowing from the outer chambers to the inner chambers.

5. A bearing comprising a housing, a bearing unit in said housing including a stationary member, a rotary member and load-transmitting elements therebetween, hoods on each side of said unit in said housing providing inner and outer chambers on each side and a communication between each chamber on each side, rotary members projecting into said inner chambers for producing, due to centrifugal force, a higher oil level in one of said inner chambers than the adjacent outer chamber and a higher oil level in one inner chamber than the other inner chamber, and means for screening fluid flowing from the outer chambers to the inner chambers.

6. A bearing comprising a housing, a stationary outer bearing member in said housing having an axial passage therethrough, a rotary inner member in said housing, a plurality of load-transmitting elements between said members, and means for producing flow of lubricant axially between said members in one direction from one side thereof to the other and axially through said passage in the outer member in the other direction.

7. A bearing comprising a housing, a bearing unit in said housing including a stationary member, a rotary member and load-transmitting elements therebetween, hoods on each side of said unit in said housing providing inner and outer chambers on each side and a communication between each chamber on each side, means for producing flow of lubricant through said chambers, and means for securing lubricant flowing between the outer and inner chambers on each side.

8. A bearing comprising a housing adapted to retain lubricant, a bearing unit in said housing comprising a stationary bearing race member, a rotating member, a plurality of load-transmitting elements, one of said members and said elements having cooperating spherical surfaces, hood members supported by said race member on either side thereof and forming inner and outer chambers within said housing on either side of said unit, said hood members being formed with passageways therethrough for flow of lubricant between the inner and outer chambers, and a lubricant seal between said race member and said rotating member independent of said passageways comprising spherical walls on said hood members, and walls carried by said rotating member spaced closely adjacent to said spherical walls, each of said last mentioned walls being formed with a groove therein.

9. A bearing comprising a housing adapted to retain lubricant, a bearing unit in said housing comprising a stationary bearing race member, a rotating member, a plurality of load-transmitting elements, one of said members and said elements having cooperating spherical surfaces, means for producing flow of lubricant axially between said members in one direction and axially through passageways in said race member in the opposite direction, and flow deflecting flanges spaced adjacent to the ends of said passageways.

10. A bearing comprising a housing adapted to retain lubricant, a bearing unit in said housing comprising a stationary bearing race member, a rotating member, a plurality of load-transmitting elements, one of said members and said elements having cooperating spherical surfaces, said race member having an outer convex spherical surface resting on the inner side of said housing so as to be displaceable with respect thereto, hood members supported by said race member on either side thereof and forming inner and outer chambers within said housing on either side of said unit, said hood members being formed with passageways therethrough for flow of lubricant between the inner and outer chambers, and a lubricant seal between said race member and said rotating member independent of said passageways comprising spherical walls on said hood members concentric with the spherical surfaces of said elements, and walls carried by said rotating member spaced closely adjacent to said spherical walls.

11. A bearing comprising a housing adapted to retain lubricant, a bearing unit in said housing comprising a stationary bearing race member, a rotating member, a plurality of load-transmitting elements, one of said members and said elements having cooperating spherical surfaces, said race member being displaceably mounted in said housing, hood members supported by said race members on either side thereof and forming inner and outer chambers within said housing on either side of said unit, said hood members being formed with passageways therethrough for flow of lubricant between the inner and outer chambers, and a lubricant seal between said race member and said rotating member independent of said passageways comprising spherical walls on said hood members concentric with the spherical surfaces of said elements, and walls carried by said rotating member spaced closely adjacent to said spherical walls.

12. A bearing comprising a housing, a bearing unit in said housing including a stationary member, a rotary member and load-transmitting elements therebetween, annular hood members supported by said stationary member on either side thereof and forming inner and outer chambers within said housing on either side of said unit, said hood members being formed with passageways therethrough adjacent to their peripheries for flow of lubricant between the inner and outer chambers and with annular peripheral channels for leading away lubricant passing outwardly through said passageways, and means for producing flow of lubricant through said chambers.

13. A bearing comprising a housing adapted to retain lubricant, a bearing unit in said housing including a stationary member, a rotary member and load-transmitting elements therebetween, and means for removing lubricant from one side of said unit to thereby cause flow of lubricant through the space between said members from the other side of said unit.

14. A bearing comprising a housing adapted to retain lubricant, a bearing unit in said housing including a stationary member, a rotary member and load-transmitting elements therebetween, and means for removing lubricant from one side of said unit and transferring it through a passage below the lubricant level in said housing to the other side to thereby cause flow of lubricant through the space between said members from the other side of said unit.

15. A bearing comprising a housing adapted to retain lubricant, a bearing unit in said housing including a stationary member, a rotary member and load-transmitting elements therebetween, means for removing lubricant from one side of said unit and transferring it to the other side to thereby cause flow of lubricant through the space between said members from the other side of said unit, and filter means in the path of lubricant flow.

16. A bearing comprising a housing adapted to retain lubricant, a bearing unit in said housing including a stationary member, a rotary member and load-transmitting elements therebetween, means for removing lubricant from one side of said unit at one rate, and means for removing lubricant from the other side of said unit at a faster rate to thereby cause lubricant to flow from said one side through the space between said members to equalize the lubricant level on said other side.

17. A bearing comprising a housing adapted to retain lubricant, a bearing unit in said housing including a stationary member, a rotary member and load-transmitting elements therebetween, means for removing lubricant from one side of said unit at one rate, and means for removing lubricant from the other side of said unit at a faster rate and transferring it to said one side to thereby cause flow of lubricant through the space between said members to equalize the lubricant level on said other side.

18. A bearing comprising a housing adapted to retain lubricant, a bearing unit in said housing including a stationary member, a rotary member and load-transmitting elements therebetween, means for removing lubricant from one side of said unit at one rate, means for removing lubricant from the other side of said unit at a faster rate and transferring it to said one side to thereby cause flow of lubricant through the space between said members to equalize the lubricant level on said other side, and filter means in the path of lubricant flow.

19. A bearing comprising a housing adapted to retain lubricant, a bearing unit in said housing comprising a stationary bearing race member, rotating bearing means, said race member and said bearing means having cooperating spherical surfaces, a hood member supported by said race member on one side thereof and forming an inner and outer chamber within said housing, said hood member being formed with a passage therethrough for flow of lubricant between the inner and outer chambers, and a lubricant seal between said race member and said rotating bearing means independent of said passageway comprising a first wall on said hood member and a second wall carried by said rotating bearing means spaced closely adjacent to said first wall, said wall being tangent to spheres concentric with said spherical surfaces.

20. A bearing comprising a housing adapted to retain lubricant, a bearing unit in said housing comprising a stationary bearing race member, rotating bearing means, said race member and said bearing means having cooperating spherical surfaces, a hood member supported by said race member on one side thereof and forming an inner and outer chamber within said housing, said hood member being formed with a passage therethrough for flow of lubricant between the inner and outer chambers, and a lubricant seal between said race member and said rotating bearing means independent of said passageway comprising a first wall on said hood member and a second wall carried by said rotating bearing means spaced closely adjacent to said first wall, one of said walls being spherical and the other being tangent to a sphere concentric with said spherical wall.

21. A bearing comprising a housing adapted to retain lubricant, a bearing unit in said housing comprising a stationary bearing race member, rotating bearing means, said race member and said bearing means having cooperating spherical surfaces, a hood member supported by said race member on one side thereof and forming an inner and outer chamber within said housing, said hood member being formed with a passage therethrough for flow of lubricant between the inner and outer chambers, and a lubricant seal between said race member and said rotating bearing means independent of said passageway comprising a first spherical wall on said hood member and a second spherical wall carried by said rotating bearing means spaced closely adjacent to said first wall, said spherical walls being concentric.

22. A bearing comprising a housing adapted to retain lubricant, a bearing unit in said housing axially movable with respect to said housing, including a bearing race member and a rotating member, said members being relatively movable in a plane through the axis of the bearing, a stationary hood member on one side of said unit forming an inner and outer chamber within said housing, said hood member being axially movable relatively to said housing together with one of said members and being formed with a passage for flow of lubricant between the inner and outer chamber, and a lubricant seal between said hood member and said rotating member independent of said passageway, comprising a first wall on said hood member and a second wall carried by said rotating member spaced closely adjacent to said first wall.

23. In a bearing for a substantially horizontal shaft, a rotatable bearing means, rotationally stationary bearing means, said means having cooperating sliding bearing surfaces, a housing around said means providing a lubricant reservoir in the lower part thereof, and rotationally stationary hood members disposed within said housing on either side of said bearing means and dividing the interior of said housing into inner and outer chambers, said hood members providing openings between said chambers of sufficient size for free circulation of lubricant therebetween, said openings being baffled to prevent lubricant thrown by rotation of said rotatable bearing means from passing directly through said openings, whereby agitation of lubricant is restrained to said inner chamber.

24. In a bearing for a substantially horizontal shaft, rotatable bearing means, rotationally stationary bearing means, said means having cooperating sliding bearing surfaces, a housing around said means providing a lubricant reservoir in the lower part thereof, and rotationally stationary hood members disposed within said housing on either side of said bearing means and dividing the interior of said housing into inner and outer chambers, said hood members providing openings between said chambers of sufficient size for free circulation of lubricant therebetween, said openings being so located with respect to the bearing surface of the rotatable bearing means that lubricant thrown therefrom by rotation of said rotatable bearing means is prevented from passing directly through said openings, whereby agitation of lubricant is restrained to said inner chamber.

25. In a bearing for a substantially horizontal shaft, rotatable bearing means, rotationally stationary bearing means, said means having cooperating sliding bearing surfaces, a housing around said means providing a lubricant reservoir in the lower part thereof, and rotationally stationary hood members disposed within said housing on either side of said bearing means and dividing the interior of said housing into an inner and two outer chambers, said hood members providing openings between said inner and outer chambers of sufficient size for free circulation of lubricant therebetween, said hood members being secured to said rotationally stationary bearing means to form a unit therewith independent of said housing.

26. In a bearing, rotatable bearing means, rotationally stationary bearing means, said means having cooperating sliding bearing surfaces, a housing around said means providing a lubricant reservoir in the lower part thereof, and rotationally stationary hood members disposed within said housing on either side of said bearing means and dividing the interior of said housing into inner and outer chambers, said hood members providing openings between said chambers of sufficient size for free circulation of lubricant therebetween, said rotational stationary hood members forming with the rotational means a seal for preventing passage of lubricant therebetween.

27. In a bearing, rotatable bearing means, rotationally stationary bearing means, said means having cooperating sliding bearing surfaces, a housing around said means providing a lubricant reservoir in the lower part thereof, and rotationally stationary hood members disposed within said housing on either side of said bearing means and dividing the interior of said housing into a central and two end chambers, said hood members providing openings between said central and end chambers of sufficient size for free circulation of lubricant therebetween, said end chambers being connected for circulation of lubricant therebetween independently of said central chamber.

AUGUST GUNNAR FERDINAND WALLGREN.